Nov. 22, 1966 W. B. LOEWENSTEIN 3,287,224
LARGE FAST NUCLEAR REACTOR
Filed Jan. 6, 1966
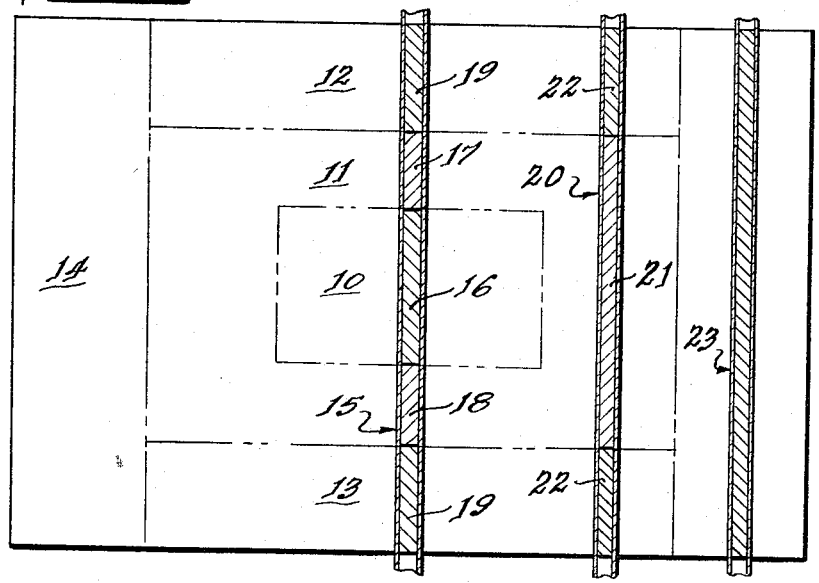
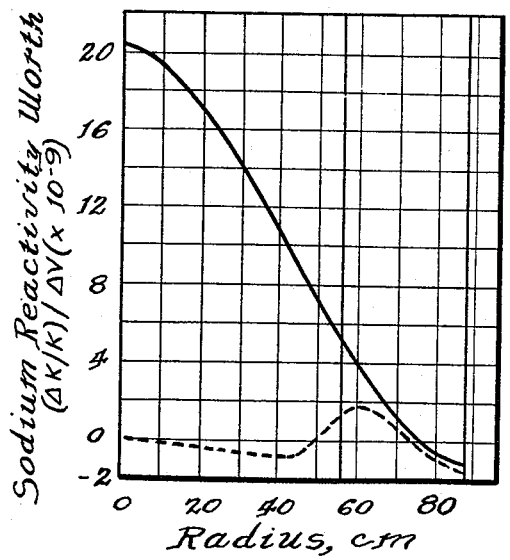
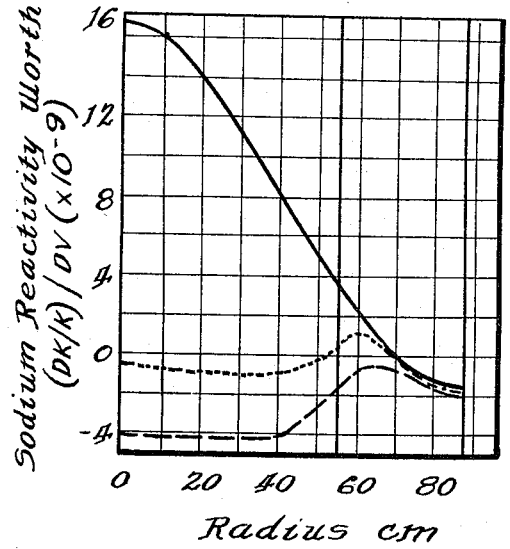
INVENTOR.
Walter B. Loewenstein
BY
Roland A. Anderson
Attorney

United States Patent Office

3,287,224
Patented Nov. 22, 1966

3,287,224
LARGE FAST NUCLEAR REACTOR
Walter B. Loewenstein, Elmhurst, Ill., assignor to the United States of America as represented by the United States Atomic Energy Commission
Filed Jan. 6, 1966, Ser. No. 519,163
3 Claims. (Cl. 176—18)

The invention described herein was made in the course of, or under, a contract with the United States Atomic Energy Commission.

This invention relates to a nuclear reactor. In more detail, the invention relates to a very large fast reactor which has a negative or relatively low positive coolant void coefficient.

Relatively small fast reactors inherently have a negative coolant void coefficient; that is, reactivity decreases with loss of coolant. As pointed out in Patent No. 3,140,234, issued July 7, 1964 to the present inventor, a potential hazard which may make the design of large fast reactors difficult is the possibility that such reactors may have a positive coolant void coefficient; that is, reactivity would increase with loss of coolant, and the patent also points out the fact that a positive coolant void coefficient occurs at lower core sizes in reactors incorporating plutonium as fuel and light metals as coolant than in other reactor designs.

It will be appreciated that this potential hazard is only present in very large reactors. The smallest reactor that will have a significant positive coolant void coefficient has a core size of about 800 liters. In contrast to this figure, it can be noted that EBR–II has a core size of 65 liters. However, the future of atomic energy appears to reside in such large fast breeder reactors for it is only in such reactors that uranium reserves can be fully utilized economically.

It is accordingly an object of the present invention to develop a very large fast reactor having a negative or relatively low positive coolant void coefficient.

It is another object of the present invention to develop a sodium-cooled fast breeder reactor operating predominantly on the uranium-238–plutonium cycle having a low sodium void coefficient.

These and other objects of the present invention are attained in a sodium-cooled fast breeder reactor operating predominantly on the uranium-238–plutonium cycle which contains a central zone of uranium-233 dispersed in thorium-232 and an outer zone of plutonium dispersed in uranium-238. The reactor may, for example, have a total volume of 3000 liters which includes an 800-liter central zone and preferably comprises a plurality of fuel elements containing a central uranium-233–thorium-232 section and upper and lower plutonium–uranium-238 sections disposed at the center of the reactor which are surrounded by fuel elements containing plutonium and uranium-238. Blanket elements containing depleted uranium will surround these elements as in conventional in the art.

The invention will next be described in connection with the accompanying drawing wherein:

FIG. 1 is a diagrammatic view, partly in section, of a nuclear reactor embodying the present invention;

FIG. 2 is a graph comparing the spatial distribution of sodium reactivity worth in the core of a prior-art 3000-liter carbide core with a core of the same size constructed in accordance with the present invention;

FIG. 3 is a similar comparison for typical oxide fuel fast breeder reactors.

According to the preferred form of the present invention, the nuclear reactor includes a central uranium-233–thorium-232 zone 10 surrounded on all sides by an outer uranium-238–plutonium zone 11 which in turn is surrounded by an upper blanket 12, a lower blanket 13, and a radial blanket 14.

The reactor can be comprised of a roughly cylindrical array of fuel assemblies wherein the central assemblies 15 comprise a central fuel uranium-233–thorium-232 section 16, upper and lower uranium-238–plutonium fuel sections 17 and 18 and upper and lower blanket sections 19 of depleted uranium. Immediately surrounding central fuel sections 15 are peripheral fuel sections 20 which are conventional, containing uranium-238–plutonium at the center 21 and depleted uranium at top and bottom 22. Surrounding these are blanket elements 23 containing depleted uranium.

As fuel, any usual core material may be used; for example, metals, oxides and carbides as well as less well-known materials such as nitrides, sulfides and mixtures of ceramic and metal.

The advantages of the present invention can best be described with reference to FIGS. 2 and 3 of the drawing. FIG. 2 shows how the sodium reactivity worth varies as a function of position in a 3000-liter core (88 cm. radius by 123 cm. height) containing plutonium and uranium-238 carbides. The solid line curve relates to the prior-art reactor and shows that the sodium reactivity worth is high near the center of the reactor but falls off rapidly as the periphery of the reactor is approached. It is evident that operation of such a reactor might be hazardous due to the positive sodium void coefficient of the reactor.

The dashed line curve in FIG. 2 shows how the sodium reactivity worth varies as a function of position in a 3000-liter plutonium carbide–uranium-238 carbide reactor incorporating an 800-liter central zone (56 cm. radius by 81 cm. height) containing uranium-233 and thorium-232. Such a reactor is relatively safe to operate because the sodium reactivity worth is negative throughout most of the reactor and is never more than slightly positive. Such a reactor is safer than one consisting solely of plutonium and uranium-238 and yet, because it operates predominantly on the plutonium–uranium-238 cycle, has a comparatively high breeding ratio.

Similarly, FIG. 3 shows the improved safety obtained by employing the present invention in an oxide-fueled reactor. The solid line curve shows that the sodium reactivity worth is high near the center of a 3000-liter plutonium-uranium-238 oxide reactor but becomes negative at the periphery. Such a reactor might not be safe to operate. Either of the reactors whose sodium reactivity worth is shown in the other curves would be safer to operate, the reactor denoted by a dashed line incorporating an 800-liter central zone of uranium-233 and thorium-232 oxides and the reactor denoted by the dotted line arbitrarily incorporating 20% of uranium-234. Even assuming the presence of 20% uranium-234, the sodium reactivity worth is negative or only slightly positive at any location in the reactor.

The following tables give the results of computations which prove the effectiveness of the present invention.

TABLE I.—METAL FUELED REACTORS

[3,000 Liter Cores]

| Case | Inner Core Volume (Liters) | Core Conversion Ratio | | | Breeding Ratio | Core Na Void (%Δk./k.) [1] | | P/A [4] | Core Mass Ratios | | Core Fuel Material [5] (kg.) | | |
|---|---|---|---|---|---|---|---|---|---|---|---|---|---|
| | | Inner | Outer | Total | | Inner | Outer | | Inner $M^u/M^{Th}$ | Outer $M^{Pu}/M^u$ | Inner | Outer | Total |
| 1 | 0 | ------ | ------ | 1.02 | 1.67 | ------ | +0.79 | 2.03 | ------ | 0.14 | ------ | 1,410 | 1,410 |
| 2 | 600 | 0.82 | 0.92 | 0.89 | 1.50 | +0.14 | +0.11 | 1.62 | 0.110 | 0.157 | 220 | 1,225 | 1,445 |
| 3 | 800 | 0.80 | 0.90 | 0.86 | 1.47 | +0.11 | −0.01 | 1.64 | 0.113 | 0.161 | 299 | 1,146 | 1,445 |
| 4 | 800 | 0.84 | 0.87 | 0.86 | 1.48 | +0.16 | +0.021 | 1.50 | 0.108 | 0.167 | 287 | 1,182 | 1,469 |
| 5 | [2] 800 | 0.95 | 0.82 | 0.87 | 1.51 | +0.27 | +0.08 | 1.31 | 0.125 | 0.176 | 328 | 1,235 | 1,563 |
| 6 | 1,200 | 0.77 | 0.87 | 0.81 | 1.39 | +0.001 | −0.15 | 1.71 | 0.117 | 0.167 | 464 | 970 | 1,434 |
| 7 | [3] 800 | 0.58 | 1.01 | 0.81 | 1.38 | −0.15 | −0.10 | 1.98 | 0.157 | 0.147 | 247 | 1,061 | 1,308 |

[1] 40% removal of core sodium.
[2] With uranium-234.
[3] Uranium-233–thorium oxide.
[4] Peak to Average Power Density in Core.
[5] Inner∼Uranium (233 or 233+234); Outer∼Plutonium.

TABLE II.—CARBIDE FUELED REACTORS

[3000 Liter Cores; 800 Liter Central Cores]

| Case | Inner Core Type [1] | Core Conversion Ratio | | | Breeding Ratio | Core Na Void (%Δk./k.) [2] | | P/A [3] | Core Mass Ratios | | Core Fuel Material (kg.) [4] | | |
|---|---|---|---|---|---|---|---|---|---|---|---|---|---|
| | | Inner | Outer | Total | | Inner | Outer | | Inner $M^u/M^{Th}$ | Outer $M^{Pu}/M^u$ | Inner | Outer | Total |
| 1 | Reference Pu-U | ------ | ------ | 0.97 | 1.49 | ------ | +0.92 | 2.05 | ------ | 0.151 | ------ | 1,375 | 1,375 |
| 2 | U²³³-Th | 0.70 | 0.94 | 0.83 | 1.33 | 0.002 | 0.013 | 1.79 | 0.131 | 0.156 | 275 | 1,037 | 1,312 |
| 3 | U²³³-U²³⁴-Th | 0.84 | 0.84 | 0.84 | 1.38 | 0.21 | +0.12 | 1.40 | 0.145 | 0.172 | 302 | 1,134 | 1,436 |
| 4 | U²³³-Th Metal | 0.76 | 0.95 | 0.86 | 1.32 | 0.014 | +0.015 | 2.08 | 0.120 | 0.154 | 314 | 1,027 | 1,341 |

[1] Carbide unless otherwise indicated.
[2] 40% removal of core sodium.
[3] Peak to Average Power Density in Core.
[4] Inner∼Uranium (233 or 233+234); Outer∼Plutonium.

TABLE III.—OXIDE FUELED REACTORS

[3000 Liter Cores; 800 Liter Central Cores]

| Case | Inner Core Type [1] | Core Conversion Ratio | | | Breeding Ratio | Core Na Void (%Δk./k.) [2] | | P/A [3] | Core Mass Ratios | | Core Fuel Material (kg.) [4] | | |
|---|---|---|---|---|---|---|---|---|---|---|---|---|---|
| | | Inner | Outer | Total | | Inner | Outer | | Inner $M^u/M^{Th}$ | Outer $M^{Pu}/M^u$ | Inner | Outer | Total |
| 1 | Reference Pu-U | ------ | ------ | 0.80 | 1.29 | ------ | +0.55 | 2.02 | ------ | 0.261 | ------ | 1,555 | 1,555 |
| 2 | U²³³-Th | 0.56 | 0.85 | 0.70 | 1.14 | −0.27 | −0.26 | 2.14 | 0.163 | 0.246 | 256 | 1,087 | 1,343 |
| 3 | U²³³-U²³⁴-Th | 0.65 | 0.73 | 0.69 | 1.13 | −0.03 | −0.13 | 1.88 | 0.189 | 0.291 | 294 | 1,244 | 1,538 |
| 4 | U²³³-U²³⁴-Th | 0.61 | 0.78 | 0.70 | 1.12 | −0.12 | −0.17 | 2.18 | 0.203 | 0.271 | 313 | 1,176 | 1,489 |
| 5 | U²³³-Th Metal | 0.76 | 0.77 | 0.76 | 1.17 | −0.28 | −0.13 | 2.19 | 0.119 | 0.273 | 312 | 1,182 | 1,494 |

[1] Oxide unless otherwise indicated.
[2] 40% removal of core sodium.
[3] Peak to Average Power Density in Core.
[4] Inner∼Uranium (233 or 233+234); Outer∼Plutonium.

In all of these computations an isotopic plutonium composition characteristic of that obtained by long irradiation was employed. The plutonium-240 content thus exceeded 20%. This isotopic composition was used in the calculations since the problems associated with plutonium having a lower 240 content are not as serious as those associated with a higher content. Thus smaller central regions would be required to attain the same sodium reactivity effect in a reactor operating on plutonium having a lower 240 content.

Detailed comparisons of data in the tables are difficult since fission distributions are not always continuous across the inner-outer core boundary. However, the cited peak to average core power densities give some indication of the extent of effective "power flattening" that has been factored into the analyses. Furthermore, the ceramic and metallic systems were assumed to contain fission products for an average of 5% and 2.75% burnup, respectively, consistent with a number of recent studies.

In general, it can be seen from these preliminary results in Tables I, II and III that the potentially deleterious core sodium reactivity may be significantly altered in a favorable direction by utilizing the uranium-233–thorium cycle over a relatively small region near the center of the core. The size of the region will depend upon basic core volume, geometry, composition and higher isotope content in both plutonium and fissile uranium, but for a 3000-liter core having the characteristics assumed in the above analysis, an 800-liter central zone is sufficient to provide a negligible coolant reactivity and thus assures safe reactor operation.

Note also from these tables that, while provision of a central uranium-233–thorium-232 zone in accordance with the present invention does result in a lower breeding ratio, the decrease is relatively slight, so that most of the advantages of a plutonium–uranium-238 reactor are retained in this design.

It will be understood that the invention is not to be limited to the details given herein but that it may be modified within the scope of the appended claims.

The embodiments of the invention in which an exclusive property or privilege is claimed are defined as follows:

1. A sodium-cooled fast breeder reactor having a core size of at least 800 liters comprising a central core of uranium-233 dispersed in thorium-232, an outer core of plutonium dispersed in uranium-238 surrounding said inner core, and a blanket of depleted uranium surrounding said outer core, the reactor operating predominantly on the plutonium-uranium-238 cycle.

2. A reactor according to claim 1 having a core size of 3000 liters wherein the inner core is 800 liters in size.

3. In a large sodium-cooled fast breeder reactor comprising a core operating primarily on the uranium-238–plutonium cycle, the improvement comprising an array of fuel elements containing a central uranium-233– thorium-232 section and upper and lower plutonium–uranium-238 sections disposed at the center of the reactor whereby a reduced sodium void coefficient is attained.

References Cited by the Examiner

UNITED STATES PATENTS

| | | | |
|---|---|---|---|
| 2,982,709 | 5/1961 | Miles | 176—17 |
| 3,140,234 | 7/1964 | Loewenstein | 176—17 |

FOREIGN PATENTS 839,392  6/1960  Great Britain.

References Cited by the Applicant

UNITED STATES PATENTS 2,870,076  1/1959  Koch.

OTHER REFERENCES

ANL-5800, 2nd ed., pp. 600–603.

Dietrich and Zinn, Solid Fuel Reactors, Section 2–2.4, p. 28.

ANS Transactions, vol. 7, No. 2, Nov. 1964, pp. 238–240, Papers 4, 5 and 6.

REUBEN EPSTEIN, *Primary Examiner.*

Notice of Adverse Decisions in Interferences

In Interference No. 97,345 involving Patent No. 3,287,224, W. B. Loewenstein, LARGE FAST NUCLEAR REACTOR, final judgment adverse to the patentee was rendered Nov. 30, 1972, as to claims 1 and 3.

[*Official Gazette May 8, 1973.*]